INVENTOR.
LESLIE A. HALL

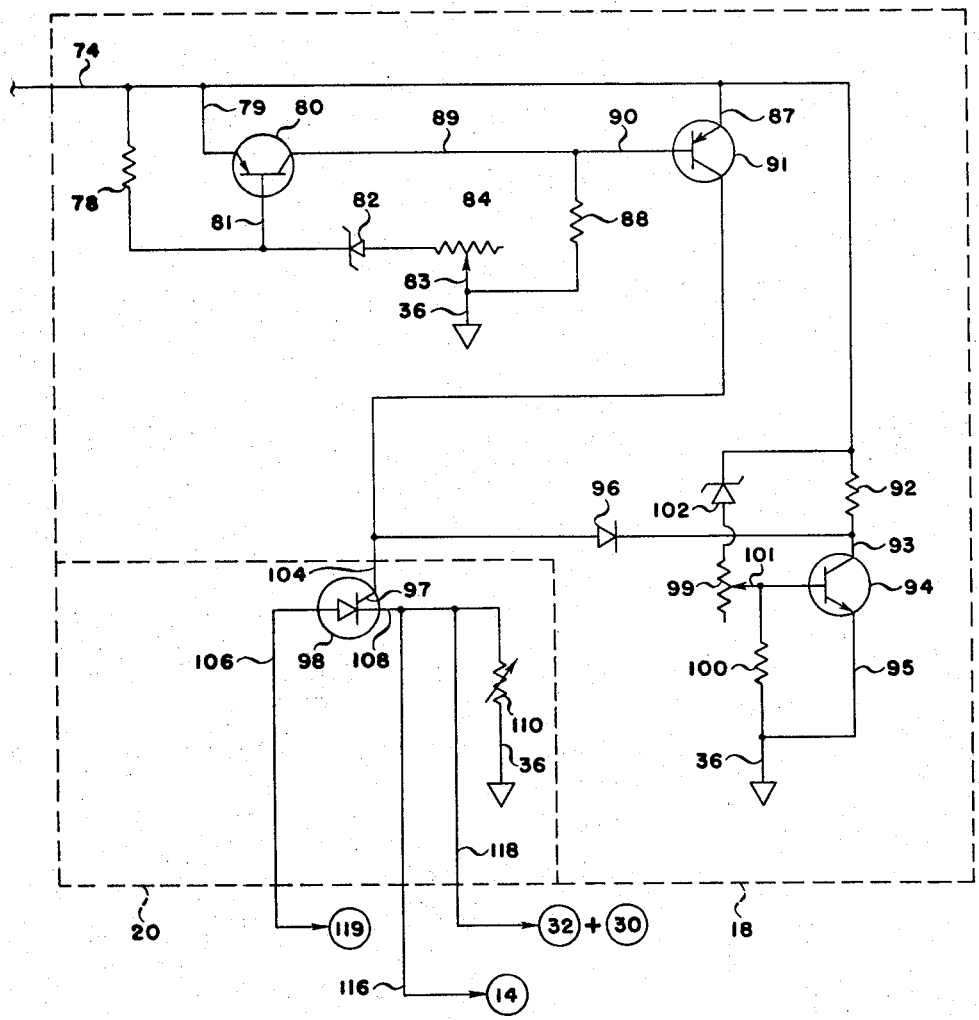
FIG. 2 CONTD.
INVENTOR.
LESLIE A. HALL

United States Patent Office 3,419,729
Patented Dec. 31, 1968

3,419,729
THEFT - PREVENTION IGNITION SYSTEM WITH ELECTRONIC VOLTAGE REGULATION FOR VEHICLES
Leslie A. Hall, Santa Clara, Calif., assignor to Lockheed Aircraft Corporation, Burbank, Calif.
Filed Aug. 3, 1966, Ser. No. 570,041
13 Claims. (Cl. 307—10)

This invention relates to a theft-prevention ignition system with electronic voltage regulation for vehicles and more particularly to an ignition system having relays actuated in a time sequential relationship connected in series with the ignition circuit of the vehicle's electrical system while providing voltage regulation of the system by controlling the flow of direct current through the alternator field coil during the operation of the vehicle.

Many law enforcement agencies, such as the FBI and state agencies, and insurance companies, have compiled statistics that show theft, or other unauthorized use of vehicles such as automobiles, is often accomplished through the use of a conductor or what is more commonly called a "jumper" connected between the ignition coil and the battery connected to the ignition switch. These statistics further show that in the majority of cases these jumpers are connected directly between the battery and starter coil from under the hood of the vehicle whereby the entire ignition system, including the switch within the passenger compartment or cab of the vehicle, is centered.

In the prior art, many proposals have been made which are intended to overcome the above-cited thefts, but none of these have been favorably received and employed to any significant extent in available vehicles. The primary reason for the failure of the prior art devices is that such devices or mechanisms are either too complex or require special attention or action of the owner or the legitimate user.

Many of the prior art devices have attempted to avoid theft of a motor vehicle by means of devices such as anti-theft keys, lockable switches formed and arranged in an ignition circuit so as to make closing or opening of the circuit difficult and time consuming; or providing switch arrangements which are connected so as to short out the distributor points of an ignition system or, in addition, the switch is hidden someplace so as to prevent an unauthorized person from being able to remove the shorted connection, or using some grounding device within the distributor casing to conceal the grounding mechanism, and many other techniques which are intended to make it difficult to detect a way to by-pass the anti-theft device.

The present invention obviates the foregoing and other disadvantages of the prior art by providing a system which combines an ignition switch, a relay and latching circuit arrangement, and a voltage regulator in a manner such that each is dependent upon the other for its operation and the actuation of the ignition system and regulation of the voltage supply are dependent upon the cooperative action of each of the elements in the system.

A primary object of the present invention is to provide a novel and improved theft-proof system for any type motor vehicles arranged so as to prevent starting of the vehicle by jumping the starter switch.

Another object of this invention is to provide a simple, effective and economical ignition circuit arrangement usable in combination with a modified, conventional ignition switch.

Still a further object of the invention is to provide an improved form of theft-proof system for motor vehicles in which the starting of the vehicles is prevented by the inability to apply voltage to the ignition system and to regulate the same for a period of time sufficient to permit the theft of the vehicle.

Still a further object of the invention is to provide a system in which starting of the vehicle is prevented by connecting a combination of latching relays in series with the ignition switch and battery so as to require energizing of the latching relays in a preselected sequence before the vehicle will start.

Yet another object of the present invention is to provide a system in which starting of the vehicle is prevented by connecting a fixed resistor of known resistance which is incorporated in the ignition switch in series with a complementary resistor connected in series with one of the latching relays to provide a preselected voltage required to actuate the series-connecting latching relays.

Yet a further object of the present invention is to provide a theft-proof system for motor vehicles so arranged as to prevent voltage regulation of the electrical system unless the vehicle is actuated by the combination of elements in the system according to a preselected scheme of actuation of the elements thereof.

The novel features which are believed to be characteristic of the invention both as to its organization and method of construction and operation, together with further objectives and advantages thereof, will be better understood from the following description considered in connection with the accompanying drawings in which an illustrative embodiment of the invention is disclosed by way of example. It is expressly understood, however, that the drawings are for the purpose of illustration and description only and do not define limitations of the invention.

Figure 1:
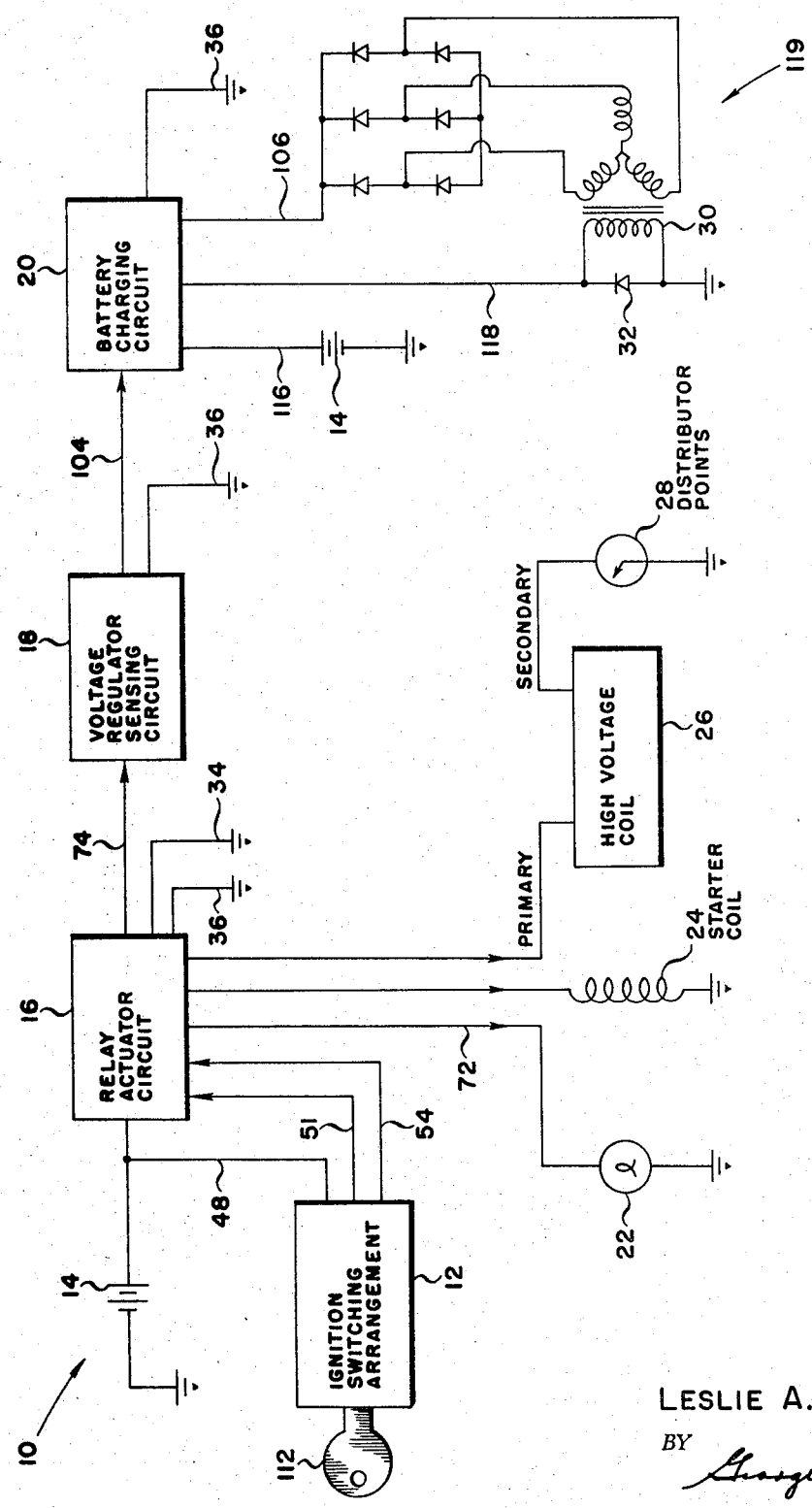
FIGURE 1 is a block diagram of a theft-prevention ignition system with electronic voltage regulation for vehicles in accordance with the present invention.

Referring now to FIGURE 1 of the drawings, it will be seen that the theft-prevention ignition system with electronic voltage regulation for vehicles of the present invention generally designated 10 includes an ignition switching arrangement 12 having a lead connected to the positive side of a battery 14 which is also connected to a relay actuator circuit 16, which is in turn connected to a sensing circuit 18 of a voltage regulator which is in turn connected to a battery charging circuit 20 which is also a part of the voltage regulator. The other leads of ignition switching arrangement 12 are connected to relay actuator circuit 16. The relay actuator circuit 16 has a first ground connection 34 which represents a conventional fixed ground connection and a second ground connection 36 which is a floating ground connection and voltage sensing circuit 18 and battery charger circuit 20 are grounded by a connection 36 which is a floating ground.

The relay actuator circuit 16 has three additional output terminals which are connected to the lights and accessories of the system designated 22, a starter coil 24 of the system and the primary of a high-voltage coil 26. The secondary winding of coil 26 is in turn connected to the distributor points 28 of the vehicle system. The circuit is completed by three output connections from the battery charging circuit 20 wherein one of the terminals is connected to battery 14, another is connected to a diode 32 which is in parallel with the alternator or generator field coil 30 and the third is connected to a diode and coil arrangement 119.

Figure 2:
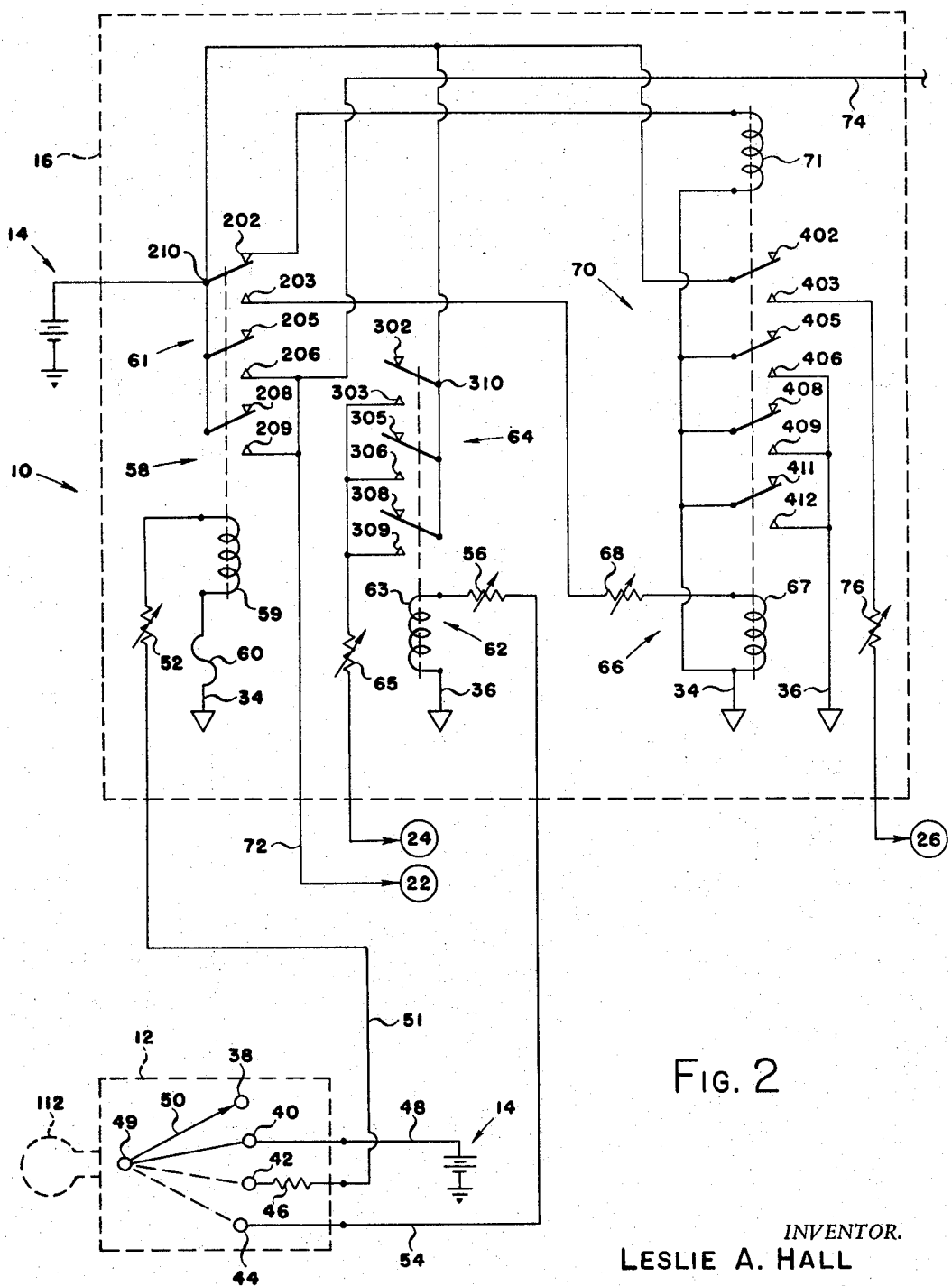
FIGURE 2 is a more detailed schematic drawing of the theft-prevention ignition system with electronic voltage regulation for vehicles shown in FIGURE 1.

A description of the invention will be continued with reference to FIGURE 2 wherein more details of the block diagram illustrated in FIGURE 1 are shown. More particularly, the ignition switching arrangement 12 comprises a conventional four-position ignition switch having positions "lock" 38, "off" 40, "on" 42, and "start" 44, and a fixed resistor 46 connected to position on 42. The ignition switching arrangement has three output terminals, one for a battery connection 48 which is in turn connected to a pivot position 49 of the ignition switch and pivot arm 50, and the positive side of battery 14, and ignition connection 51 connected to the output side of resistor 46 which is connected in series with a variable resistor 52 of relay actuator circuit 16 and a solenoid connection 54 which is connected to start position 44 of the ignition switch which is in turn connected to a variable resistor 56 of the relay actuator circuit 16. Operation of the ignition switching arrangement will be discussed hereinafter in connection with the overall operation of the system. It should be noted that ignition switching arrangement 12 is constructed such that access to resistor 46 is impossible unless the unit is damaged in the process, and would be inoperative thereby preventing operation of the system. The relay actuator circuit 16 includes a first relay 58 having a solenoid coil 59 in series with variable resistor 52 and a fuse 60 which is connected to fixed ground through a connection 34. Associated with relay 58 is a six point latching arrangement 61 which is connected to the positive side of battery 14 at point 210 thereof and has the contact points 202, 205 and 208 for the normally closed position and points 203, 206, and 209 for the normally open positions. A second relay 62 has a solenoid coil 63 connected in series with a variable resistor 56 and solenoid connection 54 and is grounded by a connection 36 which is a floating ground. Relay 62 has a second six point latching arrangement 64 similar to that associated with relay 58 wherein the normally closed positions are 302, 305 and 308 and the normally open positions are 303, 306 and 309. The normally open positions of latching arrangement 64 associated with relay 62 is connected to a variable resistance 65 which is in turn connected to starter coil 24 as illustrated in FIGURE 1. A third relay 66 has a first solenoid coil 67 connected at one end to a variable resistance 68 which is in turn connected to latching contact 203 associated with relay 58 while the other end of the relay coil 67 is connected to fixed ground by connection 34 and is also connected to three normally closed contact points of an associated latching arrangement 70 at points 411, 408, 405, respectively, and one end of a solenoid second coil 71 of the relay; the other end thereof is connected to the normally closed contact point 202 of relay 58. All three of the relays have a common connection to the positive side of battery 14 which is shown as contacts 210, 310 and 410, respectively.

To continue with the description of the relay actuator circuit 16, there is shown a connection between latching contacts 206 and 209 which are common connections which lead to the lights and accessories 22 by means of line 72 and also to the voltage sensing circuit 18 by means of line 74. In addition, contact 403 of relay 66 is connected in series with a variable resistor 76 which is in turn connected to the high voltage distributor 26. The contact points 406, 409 and 412 of the relay 66 are connected to a common ground through connection 36 which is a floating ground.

Particular attention is now directed to the connection of fixed resistor 46 of switching arrangement 12 to adjustable resistor 52 of relay actuator circuit 16. It should be noted that resistor 46 and adjustable resistor 52 are in series with solenoid coil 59 of relay 58 and fuse 60, and in such an arrangement a preselected voltage level is required to actuate coil 59. Thus, in the present arrangement the preselected voltage level required to actuate coil 59 and yet not cause fuse 60 to be burned out is determined by a combination of resistors 46 and 52. More particularly, since resistor 46 is fixed and resistor 52 is adjustable, resistor 52 is adjusted to provide the desired combined resistance value needed to activate coil 59 and yet not burn out fuse 60.

In the event an attempt is made to by-pass resistor 46 the system cannot be activated since an incorrect resistance would appear in series with coil 59. The consequence of such a condition would result in no excitation of coil 59 also or incorrect voltage, or a burning out of fuse 60 because of too much voltage. Thus, the probability of providing a resistance value equal to that of resistor 46 is very remote and no energization of the system could be accomplished. In addition, the adjustment made to resistor 59 is made at the time the unit is assembled and then sealed off. The unit is so constructed that adjustment thereof after it is sealed is extremely difficult and would only be expected to occur when the vehicle is being repaired by one who is familiar with the circuit and the value of the resistors for a particular unit. It should be noted that the resistance values selected in the combination for resistors 46 and 52 would be different for each theft-prevention device.

The first stage voltage regulator circuit 18 includes a resistor 78 which is connected at one end to connection 74 and an emitter 79 of a voltage sensing transistor 80 and a base 81 thereof, the base thereof being connected to a Zener diode 82 which is connected in turn to a potentiometer 84 with a wiper arm 83 which is grounded by connection 36 to a floating ground. At another point potentiometer 84 is connected to a fixed resistor 88 which is in turn connected to a collector 89 of transistor 80 and a base 90 of a field switching transistor 91. An emitter 87 of field switching transistor 91 is connected to the emitter of voltage sensing transistor 80, and a fixed resistor 92 is connected to a collector 93 of a reverse bias field switching transistor 94. The collector of transistor 91 is connected to the anode end of diode 96 and the gate control contact 97 of a silicon-controlled switch 98. The cathode side of diode 96 is connected to a junction between the collector of transistor 94 and resistor 92. The base of transistor 94 is connected to a wiper arm 100 of a potentiometer 99 and resistor 100. The opposite end of resistor 100 is connected to the emitter of transistor 94 and a ground connection 36 which is a floating ground. Another terminal of potentiometer 99 is connected to a Zener diode 102 the other side of which is connected between resistor 92 and the emitter 87 of transistor 91.

The charging circuit 20 is connected to sensing circuit 18 by a connection 104 which is connected to the cathode end of a silicon-controlled switch 98 via a control element 97. Charging circuit 20 includes silicon-control switch 98 and a variable resistor 110 which is connected at one end to the cathode end of control switch 98 via connection 108 and the other end is connected to a floating ground through terminal 36. Also connected to connection 108 is a connection 116 which is connected to the positive terminal of battery 14. A third connection 118 is made to connection 108 and the other end thereof is connected to a parallel connected diode 32 and alternator field coil 30. The charging circuit is completed by a connection 106 connected to the anode of silicon-controlled switch 98, the other end thereof is connected to a diode and coil arrangement 119 which is illustrative of a conventional alternator that is employed in several makes of automobile vehicles commercially available.

It should be noted that all floating ground connections have been designated by the reference character 36 for conciseness of description.

With reference to FIGURE 2, operation of the system in accordance with the present invention is commenced by turning the starting key 112 which moves pivot arm 50 from the "lock" position 38 to the "on" position 42 so as to place a voltage from the battery through the switch resistor 46 which is in turn connected in series with a complementary resistance 52 to provide a preselected total voltage drop thereacross, such as 5 volts, which is sufficient to actuate relay coil 59 which is in series with fuse 60 connected to ground. Energization of the relay 58 causes the associated latching arrangement 61 to change from its normally closed position to a normally open position whereby contacts 203, 206 and 209 are connected to battery 14 by a common connection 210. This change in position of the latching points to the normally open position provides the voltage for the lights and accessories indicated by the reference 22 in FIGURE 1 and also connects the first stage of the voltage regulator 18 via contact position 206. The voltage present at relay coil 71 through contact 202 of relay 58 is removed when relay 58 is energized. In addition, relay 66 is energized through variable resistor 68 via contact 203. This in turn actuates the second coil 67 of relay 66, so as to change the position of latch 70 to a normally open position where contact positions 403, 406, 409 and 412 are brought into action. From latching position 403 a current path is established through variable resistance 76 which in turn is connected to the high voltage coil 26. Three of the contacts 406, 409 and 412 are connected to a common connection which is in turn grounded through connection 36 which is a floating ground.

The motor of the vehicle which might employ this system is now ready for starting by turning the ignition key 112 to the "start" position 44 which places a voltage on the variable resistor 56 which is in turn connected to relay 62 and is grounded through terminal 36 which was originally a floating ground and at this point becomes a fixed ground along with all other ground connections made through terminals designated by a reference 36. Energization of relay 62 causes the latching arrangement 64 to change its contact position from the normally closed positions to the normally open positions of 303, 306 and 309. In this new position the three points are connected to a common connection which is in turn connected to variable resistor 65 which is connected to the starter coil 24 shown in FIGURE 1. In this fashion the starter coil receives its current directly from the battery 14 via a common connection 310 connected to the latching arrangement 64.

Once the foregoing step has been accomplished the system is operable so that the voltage regulator including the first stage of the voltage regulator circuit 18 and the charging circuit 20 are in operation. It should be noted at this point that the previously indicated floating grounds associated with circuits 18 and 20 have become fixed grounds as a result of the voltage being applied to relay 62 which is a portion of circuit 16. The other connections to the ignition system are as have been described hereinabove.

With the voltage regulator now in operation the voltage regulation process commences with a voltage sensing event involving resistors 78, transistor 80 and transistor 91 which may be considered the sensing elements of the voltage regulator. Whenever the voltage across potentiometer 84 drops below a preselected lower limit during operation, Zener diode 82 will become conducting so as to allow transistor 80 to turn on. A voltage will then be applied to the base 90 of transistor 91 turning it on and providing an output positive pulse along connection 104 which is in turn applied to a gating element 97 of silicon-control switch 98. As shown in FIGURE 2 of the silicon control switch 98 is part of the charging circuit 20 and consequently the output from the illustrated alternator arrangement 119 of FIGURE 1 is always present along anode terminal 106 of silicon control 98. When silicon-control switch 98 is turned on the cathode end thereof allows current to be supplied to the field coil winding 30 along cathode connection 108 to which connection 116 is connected with the current being controlled by variable resistor 110 in series with floating ground 36. The emitter 95 of transistor 94 and resistor 100 are connected and grounded such that a voltage appears at emitter 95 and the grounded end of resistor 100 when the voltage of charging circuit 20 reaches a preselected higher limit which in turn causes Zener diode 102 to conduct. The current through diode 102 causes a reverse voltage across diode 96 because the cathode end of diode 96 is made more positive than the anode end for a short duration which in turn causes a negative gating pulse to be applied to the switching element 97 of silicon control switch 98. This action represents a cycle of the voltage regulation aspect of the circuit in that as the charging circuit operates to keep the battery charged to a given level, once the level has been reached further charging of the battery is immediately detected by a portion of the sensing circuit 18 of the voltage regulator as described hereinabove and the silicon-control switch 98 is switched off by the action of the field switch transistor 94 as just described. Transistor 94 is characterized as the switch used to prevent discharging of the battery when the engine is off. When the engine is idling, the revolutions per minute will be sufficient to allow the battery to charge if the voltage of the system reaches its lower limits, opening Zener diode 82 to conduct.

Accordingly, operation of the voltage regulation system is such that the foregoing cycle of charging and discharging of the battery is a continuous one and thereby it provides an effective means for controlling the voltage of the system at a constant level without the need for conventional make or break contact arrangements which have been used heretofore in vehicles which employ a storage battery incorporated voltage regulation, and an alterating voltage generating system.

While the theft prevention ignition system of the invention has been described with reference to only a few applications, it is to be understood, of course, that alterations and modifications may be made in the applications shown or discussed without departing from the spirit and scope of the invention. Accordingly, it is expressly understood that the foregoing description shall be interpreted only as illustrative of the invention and that the spirit and scope of the invention is to be limited only by the appended claims when accorded the broadest interpretation consistent with the basic concepts taught herein.

What is claimed is:

1. In an automative vehicle a theft-prevention system with voltage regulation, an ignition system including a battery, an ignition switch having a fixed resistor element and a first conductor connecting said battery to said ignition switch, a starter and high voltage coil, said high voltage coil having a primary and a secondary, lights and accessories for the vehicle, a voltage generation system for generating a voltage for charging the battery and maintaining the voltage thereof at a preselected level, and a relay actuator circuit the combination comprising first, second and third relays, each having a multi-contact latching arrangement, each of said latching arrangements being connected to said battery by a common connection, a second conductor connecting said fixed resistor of said ignition switch to an adjustable resistor connected in series with said first relay of said relay actuator circuit, a third conductor connecting said ignition switch to an adjustable resistor connected in series with said second relay of said relay actuator circuit, conductor means for connecting said relay activator circuit to said starter coil, said lights and accessories, and the primary of said high voltage coil of the ignition system of the automotive vehicle, and means connected to said battery, said relay actuator circuit, and said voltage generation system for regulating the voltage supplies to the automotive vehicle.

2. In an automotive vehicle as defined in claim 1 wherein said means connected to said battery, said relay actuator circuit and said voltage generation system is further defined as including a voltage sensing and control circuit for sensing preselected voltage levels of said battery and a charging circuit connected to said voltage sensing and control circuit for charging said battery in response to signals from said voltage sensing and control circuit to thereby maintain the voltage of said battery within preselected voltage levels.

3. In an automotive vehicle as defined in claim 2 wherein said voltage sensing and control circuit comprises
   (a) first, second and third transistors, each having a base, an emitter and a collector,
   (b) the emitter of said first and second transistors being connected to a common voltage connection and the collector of said third transistor being connected to said common voltage connection by a first fixed series connected resistor,
   (c) the base of said first and second transistors being connected to one another by a series connected Zener diode, first potentiometer and a second fixed resistor,
   (d) the base of said first transistor being connected to one end of a third fixed resistor at the junction where said Zener diode connects the base of said first transistor and the other end of said third fixed resistor being connected to said common voltage connection of the emitters of said first and second transistors,
   (e) the collector of said second transistor being connected to said charging circuit for coupling a voltage signal thereto,
   (f) the emitter and base of said third transistor being connected to opposite ends of a fourth fixed resistor which is grounded at the emitter connected end,
   (g) the collector and base of said third transistor being connected to opposite ends of a series connection of said first fixed resistor, a second Zener diode and a second potentiometer connected to said fourth fixed resistor,
   (h) the collector of said third transistor being connected to the cathode end of a diode and the anode end of said diode being connected to said collector of said second transistor and to said charging circuit for coupling a control voltage signal thereto.

4. In an automotive vehicle a theft prevention system with voltage regulation as set forth in claim 3 wherein said charging circuit is further defined as including
   a control switch, having an anode, cathode and control electrode, the control electrode of said control switch being connected to the collector of said second transistor to receive input signals and to the anode of said diode to receive control signals,
   the cathode of said control switch being connected to said battery to provide a charging current, to one end of an adjustable resistor, the other end thereof being grounded and to a conductor connecting voltage generation system,
   the anode of said control switch being connected to said voltage generation system.

5. In an automotive vehicle a theft prevention system with voltage regulation as set forth in claim 4 wherein said control switch is further defined as a silicon control switch.

6. In an automotive vehicle propelled by an internal combustion engine and requiring a voltage supply for operation having
   a battery,
   an ignition system, lights and accessories,
   a voltage generation system and
   a theft prevention system comprising
   an ignition switch having a fixed resistor element, said ignition switch being connected to the battery,
   a relay actuator circuit connected to said ignition switch including first, second and third relays each having a multi-contact latching arrangement, each of said latching arrangements being connected to said battery by a common connection, said relay actuator circuit being responsive to signals from said ignition switch, and
   voltage regulation means connected to said battery and said relay actuator circuit and responsive to signals therefrom for regulating the voltage generated by said voltage generation system, said means comprising a voltage sensing and control circuit, and a circuit for sensing voltage levels of said battery and for controlling the charging of said battery.

7. In an automotive vehicle propelled by an internal combustion engine and requiring a voltage supply for operation having
   a battery,
   lights and accessories,
   a voltage generation system,
   ignition means for starting the internal combustion engine by applying an ignition voltage, and
   voltage regulation means connected to said battery, said voltage generation system and said ignition means for regulating the voltage supply of the automotive vehicle, said voltage regulation means comprising a voltage sensing circuit for sensing the level of the voltage supply, a voltage control circuit connected to said voltage sensing circuit, and a circuit for charging the battery, said voltage control circuit being responsive to said voltage sensing circuit and providing control signals to said circuit for charging the battery.

8. In an automotive vehicle propelled by an internal combustion engine and requiring a voltage supply for operation as defined in claim 7 wherein said voltage regulation means is further defined as
   (a) first, second and third transistors, each having a base, an emitter and a collector,
   (b) the emitter of said first and second transistors being connected to a common voltage connection and the collector of said third transistor being connected to said common voltage connection by a first fixed series connected resistor,
   (c) the base of said first and second transistors being connected to one another by a series-connected Zener diode, first potentiometer and a second fixed resistor,
   (d) the base of said first transistor being connected to one end of a third fixed resistor at the junction where said Zener diode connects the base of said first transistor and the other end of said third fixed resistor being connected to said common voltage connection of the emitters of said first and second transistors,
   (e) the collector of said second transistor being connected to said charging circuit for coupling a voltage signal thereto,
   (f) the emitter and base of said third transistor being connected to opposite ends of a fourth fixed resistor which is grounded at the emitter connected end,
   (g) the collector and base of said third transistor being connected to opposite ends of a series connection of said first fixed resistor, a second Zener diode and a second potentiometer connected to said fourth fixed resistor,
   (h) the collector of said third transistor being connected to the cathode end of a diode and the anode end of said diode being connected to said collector of said second transistor and to said charging circuit for coupling a control voltage signal thereto.

9. In an automotive vehicle propelled by an internal combustion engine having a battery for supplying a voltage to the internal combustion engine, an ignition system having a voltage regulation circuit, and a voltage generation circuit connected to said voltage regulation circuit, said ignition system being connected to said battery for charging and for maintaining the voltage of the battery at a preselected voltage level, and a theft prevention ignition system the combination comprising
   an ignition switching arrangement having a key for actuating said switching arrangement, and a fixed resistor element, and
   a relay actuator circuit having first, second and third solenoid relays, and first, second and third multi-contact latching arrangements, respectively, said relay actuator circuit being connected to said ignition switching arrangement and the battery, and being responsive to a signal received from said ignition switching arrangement initiated by turning said key, said first solenoid relay having a first adjustable resistor connected in series therewith which is connected in series to said fixed resistor of said ignition switching arrangement to thereby energize said first solenoid relay and change the position of the contact points of said first latching arrangement, said second solenoid relay having a second adjustable resistor connected in series therewith which is connected to said ignition switching arrangement to thereby energize said second solenoid relay and changing the position of the contact points of said second latching arrangement, said third solenoid relay having a third adjustable resistor connected in series therewith, which is connected to a contact point of said first latching arrangement to thereby energize one coil of said third solenoid relay when the position of the contact points of said first latching arrangement are changed, said third solenoid relay having a second coil connected at one end to said one coil and ground, and the other end to a contact point of said first latching arrangement and said battery to thereby de-energize said second coil and change the position of the contact points of said third latching arrangement when said first latching arrangement changes the position of the contact points.

10. In an automotive vehicle of the type defined in claim 9 wherein
said first adjustable resistor of said relay circuit is further defined as having a preselected resistance value compatible to that of said fixed resistor of said ignition switching arrangement to thereby provide a preselected voltage value needed to energize said first solenoid relay.

11. A voltage regulator for automotive vehicles propelled by an internal combustion engine and requiring a voltage supply the combination, comprising
a voltage sensing circuit for sensing the level of voltage of a battery connected thereto, a voltage control circuit connected to said voltage sensing circuit, and responsive thereto, and a circuit for charging said battery, said voltage control circuit being responsive to said voltage sensing circuit and providing control signals to said circuit for charging the battery, said circuit for charging the battery being connected to a voltage generation system to thereby provide a voltage source for charging said battery.

12. A voltage regulator for an automotive vehicle propelled by an internal combustion engine and requiring a voltage supply for the operation thereof the combination comprising a battery, a voltage generation system, and voltage regulation means connected to said battery and said voltage generation system, said voltage regulation means comprising (a) first, second and third transistors, each having a base, an emitter and a collector, (b) the emitter of said first and second transistors connected to a common voltage point and the collector of said third transistor is connected to said common voltage point by a first fixed series-connected resistor, (c) the base of said first and second transistors being connected to one another by series-connected Zener diode, first potentiometer and a second fixed resistor, (d) the base of said first transistor being connected to one end of a third fixed resistor at the junction where said Zener diode connects the base of said first transistor and the other end of said third fixed resistor being connected to said common voltage point of the emitter of said first and second transistors, (e) the collector of said second transistor being connected to a charging circuit for coupling a voltage signal thereto, (f) the emitter and base of said third transistor being connected to opposite ends of a fourth fixed transistor which is grounded at the interconnected end, (g) the collector and base of said third transistor being connected to opposite ends of a series connection of said first fixed transistor, a second Zener diode and a second potentiometer connected to said fourth fixed resistor, (h) the collector of said third transistor being connected to the cathode of a diode and the anode end of said diode being connected to said collector of said second transistor and said input signal connection to said charging circuit for coupling a control voltage signal thereto.

13. A theft prevention device the combination comprising an ignition switch having a fixed resistor element, said ignition switch being connected to a battery, and a relay actuator circuit connected to said ignition switch including first, second and third relays each having a multi-contact latching arrangement each of said latching arrangements being connected to said battery by a common connection, said relay actuator circuit being responsive to signals from said ignition switch, said fixed resistor of said ignition switch being connected in series with an adjustable resistor of said relay actuator connected in series with said first relay, the combination of said adjustable and fixed resistors being of a preselected value to provide the voltage level necessary to activate said first relay, said relay actuator being connected to a voltage regulation means for actuation thereof which maintains the voltage of said battery at a preselected voltage level.

References Cited

UNITED STATES PATENTS

| 2,755,393 | 7/1956 | Schmitt | 307—10 |
| 3,136,307 | 6/1964 | Richard | 307—10 |

ROBERT K. SCHAEFER, *Primary Examiner.*

D. SMITH, *Assistant Examiner.*

U.S. Cl. X.R.

340—64